United States Patent
Graf et al.

[15] 3,663,285
[45] May 16, 1972

[54] WETTING AGENT-CONTAINING PIGMENT COMPOSITION

[72] Inventors: Hans Graf, Niederrodenbach; Dieter Riffel, Frankfurt, both of Germany

[73] Assignee: Deutsche Gold-und Silber-Scheideanstalt Vormals Roessler, Frankfurt am Main, Germany

[22] Filed: July 28, 1969

[21] Appl. No.: 846,654

[30] Foreign Application Priority Data

July 27, 1968 Germany..................P 17 92 148.1

[52] U.S. Cl. ..................................106/308 Q, 106/307
[51] Int. Cl. ......................................................C08h 17/04
[58] Field of Search..............106/308 Q, 308 F, 308 M, 307, 106/304; 252/385

[56] References Cited

UNITED STATES PATENTS

| | | | |
|---|---|---|---|
| 2,118,511 | 5/1938 | Hacks | 106/296 |
| 3,882,254 | 4/1959 | Kloepfer et al. | 260/41 |
| 3,083,115 | 3/1963 | Bader | 106/308 |

*Primary Examiner*—James E. Poer
*Assistant Examiner*—J. V. Howard
*Attorney*—Michael S. Striker

[57] ABSTRACT

A wetting agent-containing pigment composition is formed by adding to the composition at least one pyrogenically produced and coagulated metal or non-metal oxide or a co-coagulate of such oxides.

The addition improves the control of the action of the wetting agent, inhibits the tendency to form agglomerates and acts as an aid in grinding the composition.

9 Claims, 7 Drawing Figures

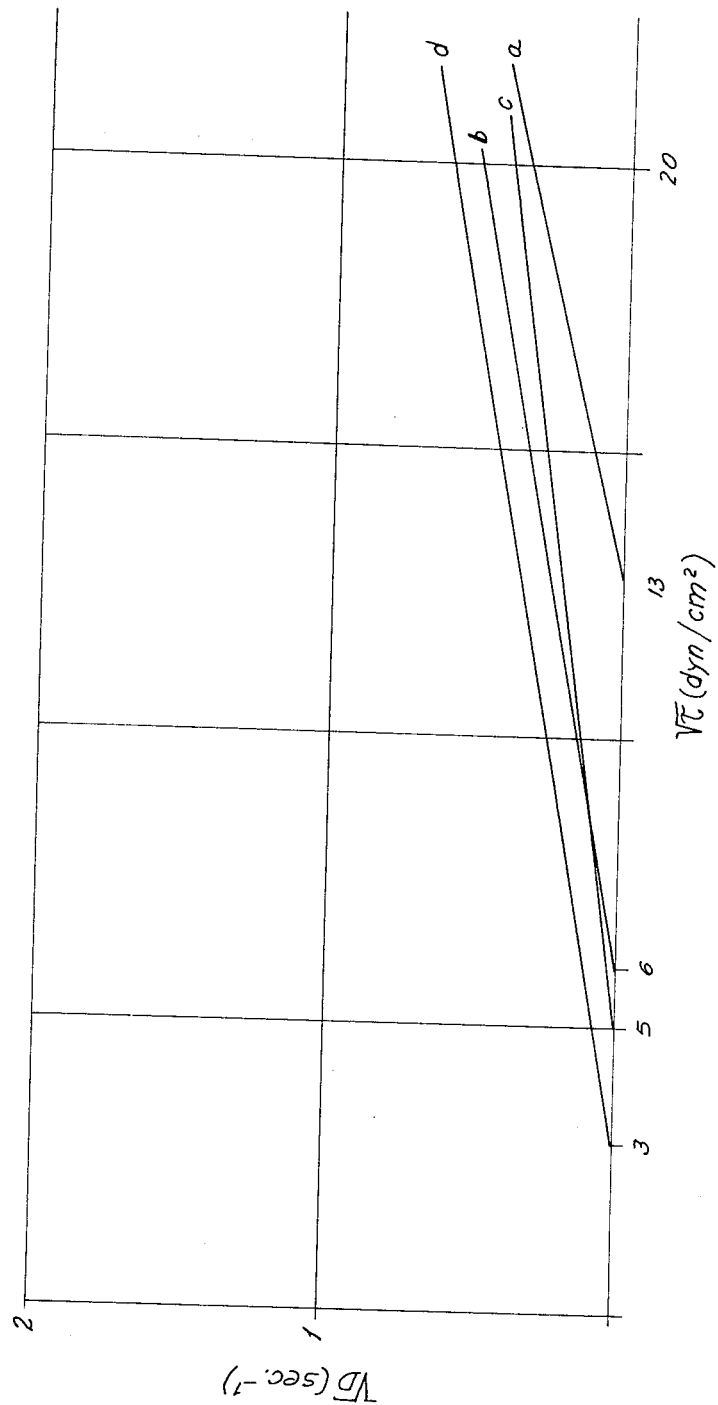

WETTING AGENT-CONTAINING PIGMENT COMPOSITION

BACKGROUND OF THE INVENTION

The invention relates to a pigment composition that contains a liquid wetting agent, for instance, an oil, a plasticizer, or a resin solution. The pigment may be an inorganic or organic pigment or a carbon black pigment such as are used in printing inks, colored varnishes, paints for surface coatings, and coloring compositions for elastomers and plastics.

When setting up this kind of printing inks, varnishes, paints and coloring compositions, the degree of agglomeration and the dispersing properties of the pigments in the binding agent system or plastics are of critical importance. A good dispersibility is the condition for a uniform distribution of the pigment in the binding agent. The degree of agglomeration of the pigment has an effect on the color depth and intensity obtained.

High voluminous pigments and carbon blacks which have a tendency to result in dusting and which are difficult to incorporate in general and as to dosage in binding systems, elastomers, or plastic blends, have already been subjected to prewetting with liquid wetting agents. Depending on the final use of the pigment, wetting agents are selected such as for instance oils, plasticizers, resin solutions, or the like. This then reduces the obnoxious tendency to cause dusting during handling of the pigments and effects also a desirable decrease of the initial volume which saves packing and transportation space. This step, however, has the drawback that the thus-produced increased density of the pigment makes it necessary to obtain a higher dispersibility when the pigment is incorporated, for instance in a binding agent system for printing inks. In addition, the preliminary wetting of the pigment frequently results in an undesirable pigment agglomeration which, in turn, leads to a considerable lowering of the color intensity of the pigment and thus makes it necessary o employ more pigment in the binding system.

The invention therefore has the object to provide for a pigment composition which contains a liquid wetting agent and avoids the shortcomings of greater agglomeration and decreased dispersibility.

SUMMARY OF THE INVENTION

This object is met by a pigment composition which comprises (a) an organic, inorganic or carbon black pigment; (b) a liquid wetting agent therefor and (c) a wetting control and anti-agglomerant agent, the latter consisting of at least one pyrogenically produced and coagulated metal or non-metal oxide.

The invention specifically embraces a pigment composition wherein the wetting agent is castor oil and the wetting control and anti-agglomerant agent is pyrogenically produced silicon dioxide or a co-coagulate of silicon dioxide and aluminum oxide.

BRIEF DESCRIPTION OF THE DRAWING

FIG. 3a is an enlarged partial view of the curves of FIG. 3;

DESCRIPTION OF THE PREFERRED EMBODIMENTS

Figure 1:
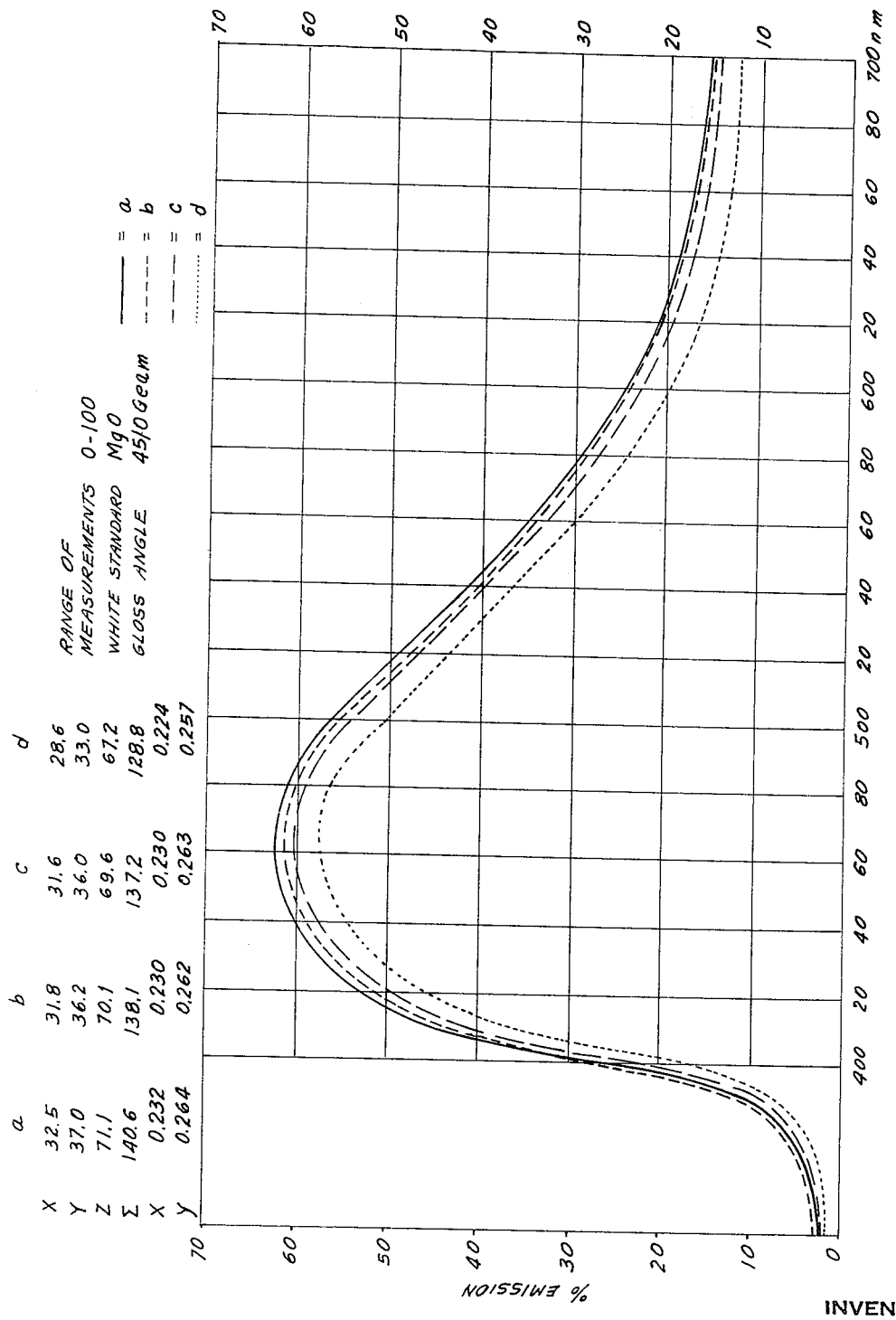
FIG. 1 shows remission curves of white addition combinations of three-component compositions of the invention containing silicon dioxide as compared to compositions made without oxide.

As stated, the pigment composition of the invention comprises the pigment proper, a liquid wetting agent, for instance an oil, and a special agent added to act as a control for the wetting action, as an inhibitor of the agglomeration tendency and as an aid in the grinding of the composition. Preferably, the pyrogenically produced oxide which is added as this special agent is a pyrogenically produced and coagulated silicon dioxide or a co-coagulate of silicon dioxide and aluminum oxide.

Regarding the pyrogenically produced silica, reference is made, for instance, to the U.S. Pat. application Ser. No. 798 143, filed Feb. 10, 1969 now abandoned.

The pigment composition preferably is made by simultaneous wetting of the pigment and addition of the special agent. Thus pigment, wetting agent, and pyrogenic oxide may be mixed in a ball mill or in a tumbler mixer in one operation. However, the wetting agent can also be added prior to the drying of the mixture of pigment and oxide, or it can be added during the drying or subsequent thereto but, in any case, preceding the grinding process. The addition of the wetting agent may for instance be effected by spraying the wetting agent onto the mixture of the other materials.

The oxide may be used as a single oxide or as a mixed oxide (co-oxide) or as an oxide mixture.

Preferred is the use of silicon dioxide or of a co-coagulate of silicon dioxide and aluminum oxide as the additive to the composition in addition to the wetting agent.

The amounts added preferably are from 3 to 30 percent by weight of the total composition of wetting agent and from 0.5 to 5 percent by eight of oxide, for instance, silicon dioxide or co-coagulate of silicon dioxide and aluminum oxide.

The invention also embraces the use of a specific preferred oil with the specific preferred addition of oxides according to the invention. The prior use of oils for wettings pigments, for instance for printing inks, has resulted in difficulties. In case of specific pigments, particularly ferrocyan blue (Milori blue), the so-far employed oil types such as varnish oils have only been of limited usefulness since their wetting properties were inadequate in respect to these particular pigments.

Surprisingly it has been found that castor oil is a particularly useful wetting agent for ferrocyan blue in the context of the present invention because it is subject to strong adsorption in this pigment and permits a particularly good distribution in pigment binding agents.

The invention therefore embraces a specific pigment composition on the basis of ferrocyan blue for use in printing inks, lacquer paints and surface-coating paint systems which composition comprises a content of between about 3 and 15 percent by weight of castor oil as wetting agent and between about 0.5 and 5 wt. percent of silicon dioxide as special additive. The silicon dioxide in this case is pyrogenically produced and has the following specific properties:

| | |
|---|---|
| Specific surface (BET) | 50–400 $m^2/g$ |
| Particle diameter | 8–20 nm |
| Index of refraction: | 1.45 |
| Structure: | X-ray amorphous |

Another pigment composition of the invention based on ferrocyan blue includes between 3 and 15 percent by weight of castor oil as wetting agent and 0.5 to 5 percent by weight of a co-coagulate of silicon dioxide and aluminum oxide. The percentages in all of these cases are relative to the total weight of the pigment composition. The co-coagulate has the following specifications:

| Specific surface (BET) | ca. 150 m²g |
| Particle diameter | 20–60 nm |
| Index of refraction | 1.45 |
| Structure | X-ray amorphous |

The color depth and brilliance of a pigment can be reduced however by too large a content of adsorbed wetting agent. Depending on the amount of the pyrogenically formed coagulated oxide or co-coagulate which is present according to the invention in the pigment composition in addition to the liquid wetting agent, a more-or-less thorough wetting of the surface of the pigment particles is effected by the liquid wetting agent. During the further processing, for instance in making printing inks, this has the effect that the binding agent, for instance resin, which is present in the printing ink system will be retained on the pigment surface exclusively to an extent depending on the amount of oxide present. Thus it is possible to control the prewetting of the pigment composition in a desired manner by a corresponding dosage of the oxide addition and thus to limit the wetting to a degree where the color depth and brightness of the pigment is at its optimum.

In addition to causing a better distribution of the wetting agent, the added coagulated oxide also has a desirable effect in preventing the agglomeration of the pigment to larger secondary particles. The oxide thus has an additional effect in the subsequent formation of pigments by way of a grinding aid which further improves the color depth and brightness. The use of the three-component pigment composition comprising pigment, wetting agent and oxide additive and the resulting increase of color depth and brightness has the effect in making of printing inks, lacquers or paints for surface coating that, in many cases, the pigment content of the composition can be substantially reduced without affecting the color effect. Thus, in cases where an increase of the color effect is not necessary, the use of the pigment compositions of the invention permits obtaining significant savings.

The oxide addition imparts to the pre-wetted pigments also an improved dispersibility in the conventional binding agent system and at least has the effect of a steady gloss level, but in most cases results in a gloss increase of the resulting colored product.

A further advantage of the pigment compositions of the invention is the possibility to form printing inks, lacquers or coating paints which, as compared with pigments that contain only wetting agents, have a lower flow limit (yield point), which is highly desirable for the further processing of the composition.

Another advantage is the acceleration of the drying process in case of printing inks.

The three-component pigment compositions of the invention are also highly useful for making colored elastomer or plastic compositions, in which case the better dispersing properties as well as the more uniform and intense coloring are the main advantages.

The following examples will illustrate the improvements that can be obtained by the pigment compositions of the invention in regard to color depth, brightness, gloss and flow properties. The illustration is given with reference to the above-described drawings.

EXAMPLE 1

This example illustrates the effect of increasing amounts of pyrogenically obtained and coagulated silicon dioxide on the color depth and brightness in printing inks that contain ferrocyan blue, a wetting agent and the pigment composition of the invention, as compared with a printing ink that has been made with a pre-wetted pigment composition formed without an oxide additive.

The wetting agent in this case was castor oil 81 and the pigment was Milori blue (type VC 705 E made by the Vossen Corporation of Germany). The compositions of the test specimens are apparent from the following

TABLE A

| Composition | a | b | c | d |
|---|---|---|---|---|
| Milori blue (VC 705 E) | 90 | 90 | 90 | 90 |
| castor oil | 10 | 9 | 7 | 5 |
| SiO₂ (pyrogenic) | — | 1 | 3 | 5 |

Each of these compositions was made by mixing the components together and subjecting them to a subsequent three-hour grinding in a ball mill. The mill was a 1-liter mill containing 100 g of composition.

The determination of the color intensity or brightness of the individual compositions was made by tracing the remission curves of white additions in the wave length range of the visible spectrum (400–700 nm) by means of a spectrophotometer (made by the Bausch and Lomb Company). The test composition was formed as follows: varnish : pigment composition : $TiO_2 = 100$ g : 1 g : 30 g.

As the remission curves shown in FIG. 1 illustrate, the use of silicon dioxide in the compositions b, c, and d, and in particular an increasing content of this additive, produced a distinct increase in the intensity and brightness, respectively.

The following Table B shows the primary color values X (red), Y (green), and Z (blue); the sum of these values, and the primary color components $x$ and $y$, which were obtained by taking the following ratios:

$$X/(X + Y + Z) (= x) \text{ or } Y/(X + Y + Z) (= y)$$

The white-base compositions of the individual specimens were made in compliance with the standard of the German DIN 5033 test procedure.

TABLE B

| Pigment composition | a | b | c | d |
|---|---|---|---|---|
| Primary color value X | 32.5 | 31.8 | 31.6 | 28.6 |
| Y | 37.0 | 36.2 | 36.0 | 33.0 |
| Z | 71.1 | 70.1 | 69.6 | 67.2 |
| Sum X–Y–Z | 140.6 | 138.1 | 137.2 | 128.8 |
| Primary color component x | 0.232 | 0.230 | 0.230 | 0.224 |
| Primary color component y | 0.264 | 0.262 | 0.263 | 0.257 |

In accordance with accepted procedure, the statement of the two primary color components $x$ and $y$ is sufficient to specify the color hue and saturation (color intensity) of any color valence. These two values $x$ and $y$ can be entered in a graph, the primary color table, and there can thus be obtained the locations (loci) of the individual colors in the form of entries of the color types. The loci of the colors of the spectrum in this case form a curve shaped like the sole of a shoe—the so-called purple line. Within the closed curve, there are the loci of all real colors.

Figure 2:
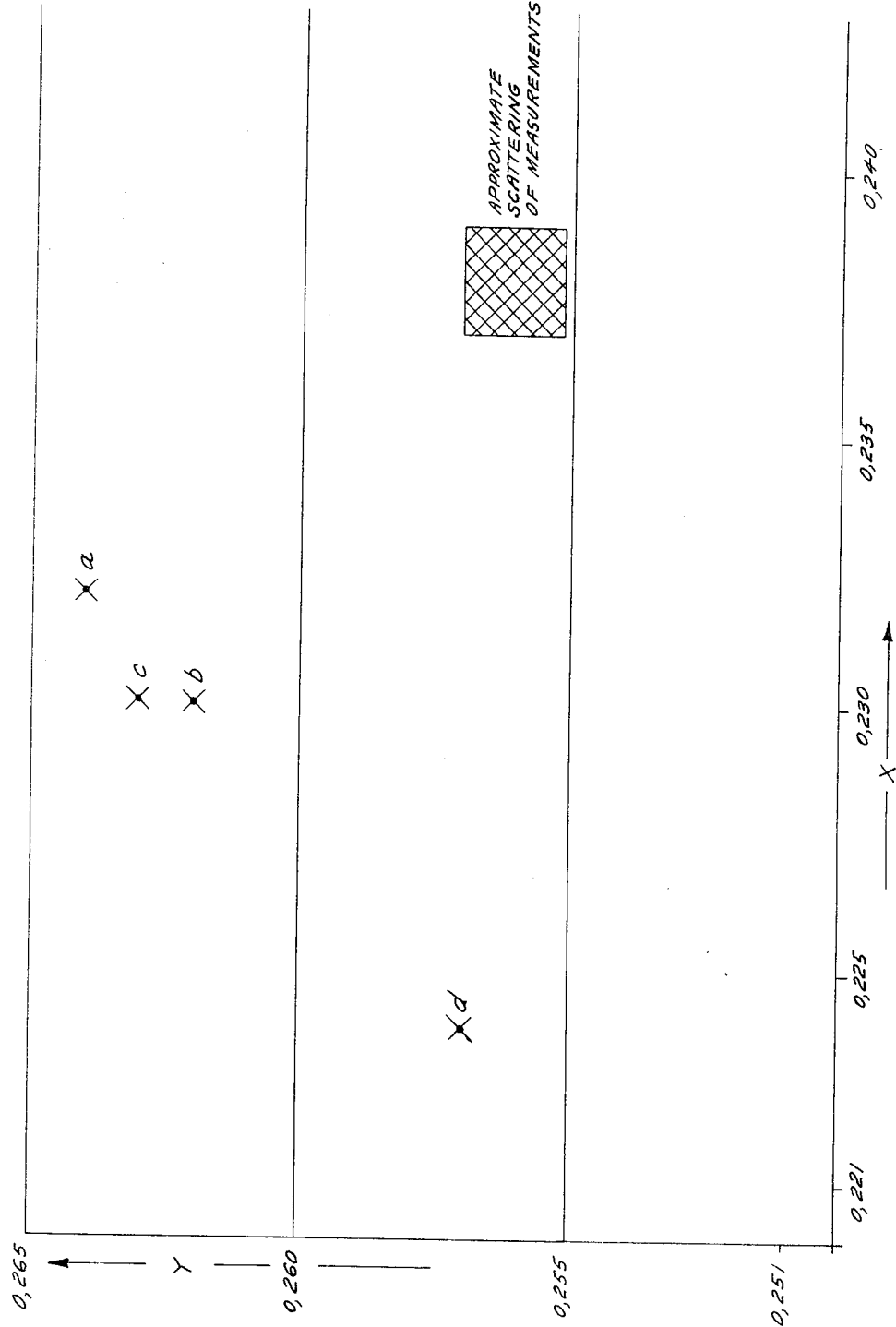
FIG. 2 shows the color loci of white additions on the standard color-value curve in regard to three-component pigment compositions containing silicon dioxide and compared to compositions made without oxide.

FIG. 2 shows the loci of the colors of white-base combinations (ratio 1:30) of individual pigment preparations in the graph which represents a detail of the surface formed by the spectrum color curve of the so-called primary color table. The individual color loci result from the primary color component $x$ as entered on the horizontal axis of the graph and the primary color component $y$ entered on the vertical axis.

As appears from FIG. 2, the distance between the color locations from the so-called no-color point ($x,y = 0.33$) increases regularly with increasing oxide content of the compositions which indicates an increase in the brightness of the color. Closest to the no-color point is the location of the composition that is free of $SiO_2$. The marked increase in intensity and brightness of the $SiO_2$-containing compositions is particularly significant since, in the test composition, only 1 gram of composition is used with 100 g of varnish and the substantial amount of 30 g of TiO$_2$. This 1 g in the three samples contained with 0.90 g pigment only 0.09 g castor oil and 0.01 g oxide
with 0.90 g pigment only 0.07 g castor oil and 0.03 g oxide
with 0.90 g pigment only 0.05 g castor oil and 0.05 g oxide

EXAMPLE 2

This example illustrates the effect of increasing amounts of pyrogenically obtained and coagulated SiO$_2$ as obtained in "Korrex" prints, that is prints made on a hand-operated printing press, in regard to the gloss value of the total surface. These prints were made with printing inks containing ferrocyan blue, castor oil, and pigment. The results are compared with "Korrex" prints made with printing inks that contain an oxide-free but pre-wetted pigment.

In this example the same ferrocyan blue pigment was employed as in Example 1. The test procedure again included the pigment compositions $a$ to $d$ listed in Table A. The contents of the printing ink in pigment (binding agent: lacquer) was in each case 30 percent by weight.

The measurements of the gloss of the total surfaces of the "Korrex" prints were made with a Lange glossmeter at a measuring angle of 45°. The degrees of gloss found are summarized in the following table.

TABLE C

| Pigment Composition | Degree of Gloss (%) |
|---|---|
| a | ≈10 |
| b | ≈12.5 |
| c | ≈13.5 |
| d | ≈15.0 |

The table shows that the printing inks containing the pigment compositions of the invention have a substantial superiority in gloss production during printing, as compared with oxide-free compositions.

EXAMPLE 3

This example illustrates the flow limits (yield points) of the printing inks which have been tested in regard to gloss in Example 2.

The flow limit of a printing ink is the result of the conglomeration of super-finely dispersed pigment particles which form what is called a "structure." The higher the flow limit of a printing ink, the worse are its flow properties. For most printing inks, printing colors are desired having low flow limits in order to prevent a "rigidifying" of the printing ink in the color box and thus an interruption of the color supply to the printing press.

The viscosity ** of a liquid is determined by the ratio of shear stress $\tau$ (pressure in the direction of movement) to speed differential in the slot ($D$) as follows:

$$**= \tau/D$$

With many liquids, for instance with water, the shear stress is directly proportional to the shear gradient. In a diagram, the viscosity then forms a straight line with the axes $\tau$ and $D$.

With most binding agents for printing inks, particularly pigmented printing inks, the tests results, however, not in straight lines but in curves which indicate that the viscosity $\eta$, according to the above definition, changes for each specific shear stress. It is impossible, however, in most cases to obtain useful test results for a low shearing differential or gradient, since thixotropic effects interfere. Thus, it is not possible to determine whether the viscosity curve runs through the intersection of the two axes of the graph or intersects the $\tau$-axis at a higher value.

Reference is made to the book by Casson on "Rheology of Disperse Systems," C.C. Mills Edit., Pergamon Press, New York 1959, pp. 84–104. On the basis of an investigation of the formation and disintegration of pigment-particle structures in printing inks subjected to shear stresses the following equation was developed by Casson:

$$\sqrt{\tau} = K_0 + K_1 \sqrt{D}$$

In a system of coordinates with the axes $\sqrt{\tau}$ and $\sqrt{D}$, according to past experiences, straight lines were obtained both for offset and book-print varnishes and also for pigmented printing inks and high-concentration flushed or slightly ground pigment varnish pastes. The extrapolated point of intersection of this line with the $\sqrt{\tau}$ axis indicates the minimum shear stress $\tau_o$ which is necessary to readily permit a shear movement. The $\tau_o$ value is designated the flow limit.

If the straight line that runs through $\tau_o$ is shifted parallel through the point of intersection of the two axes of the graph, the viscosity curve $$\frac{\sqrt{\tau}}{\sqrt{D}} = \sqrt{\eta_\infty}$$

is obtained, The $\eta \infty$ in this equation is the value of $\eta$ which results when $\tau$ is extremely large. This about expresses the conditions in the printing press.

Figure 3:
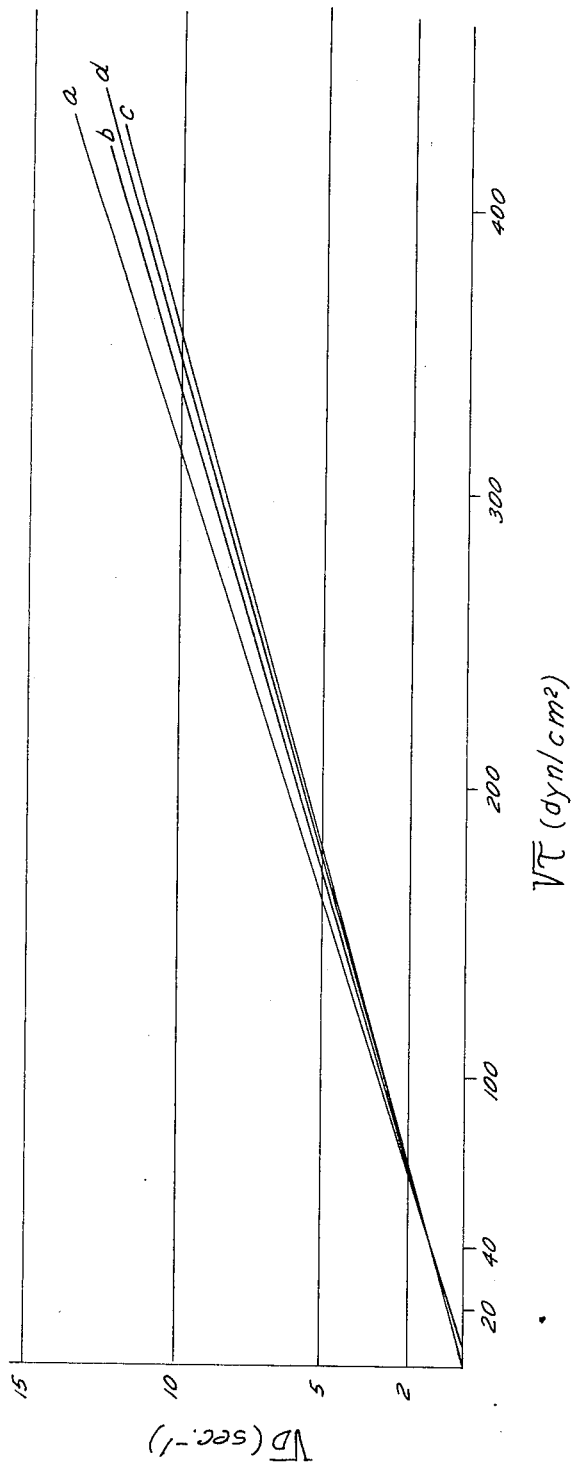
FIG. 3 shows flow curves of printing inks which contain the three-component pigment compositions of the invention, including silicon dioxide, as compared with printing inks made with pigment compositions not containing oxides.

In FIGS. 3 and 3a, the results are shown of the viscosity measurements with the pigment compositions $a$ to $d$ and the printing inks thus made. The values found for $\sqrt{\tau}$ (dyn/cm$^2$) have been entered on the horizontal axis and the values for $\sqrt{D}$(sec$^{-1}$) have been entered on the vertical axis. Measurements were carried out with a Laray viscosimeter. For the individual colors, curves $a$ to $d$ resulted which had different gradients and intersected the $\sqrt{\tau}$ axis in different places. The gradient of the straight line is a measurement for the viscosity. The viscosity of the printing ink is as much higher as the line is more level. The intersection of the line with the $\sqrt{\tau}$ axis determines the flow limit.

A comparison between the straight lines which were found for the different printing inks shows that the flow limits of the SiO$_2$-containing pigment compositions $c$ and $d$ and the thus-made printing inks are distinctly lower in spite of higher viscosity than the printing inks which were made with the oxide-free pigment and had a lower viscosity.

The following table shows the shear stress (dyn/cm$^2$) of the various flow limits of the tested printing inks:

TABLE D

| Printing ink containing pigment composition | Shearing stress (dyn/cm$^2$) |
|---|---|
| a | 169 |
| b | 36 |
| c | 25 |
| d | 10 |

EXAMPLE 4

When comparing conventional and castor oil-wetted pigments, it was found that in case of the wetting with castor oil the density increase or volume decrease took place substantially more rapidly than in case of the conventional wetting with mineral oil.

With prints of printing inks containing Milori blue VC 705 E, the following degrees of gloss were found:

Composition $e$:
Pre-wetted with 10 percent mineral oil (sold under the designation PKWF 4/7 by the Haltermann Company of Germany) 51–53%

Composition $f$:
After wetting with 9 percent castor oil and including 1 percent of a pyrogenic silicic acid (sold under the tradename "Aerosil 200" by the Degussa Corporation of Germany) 57–60%

Figure 4:
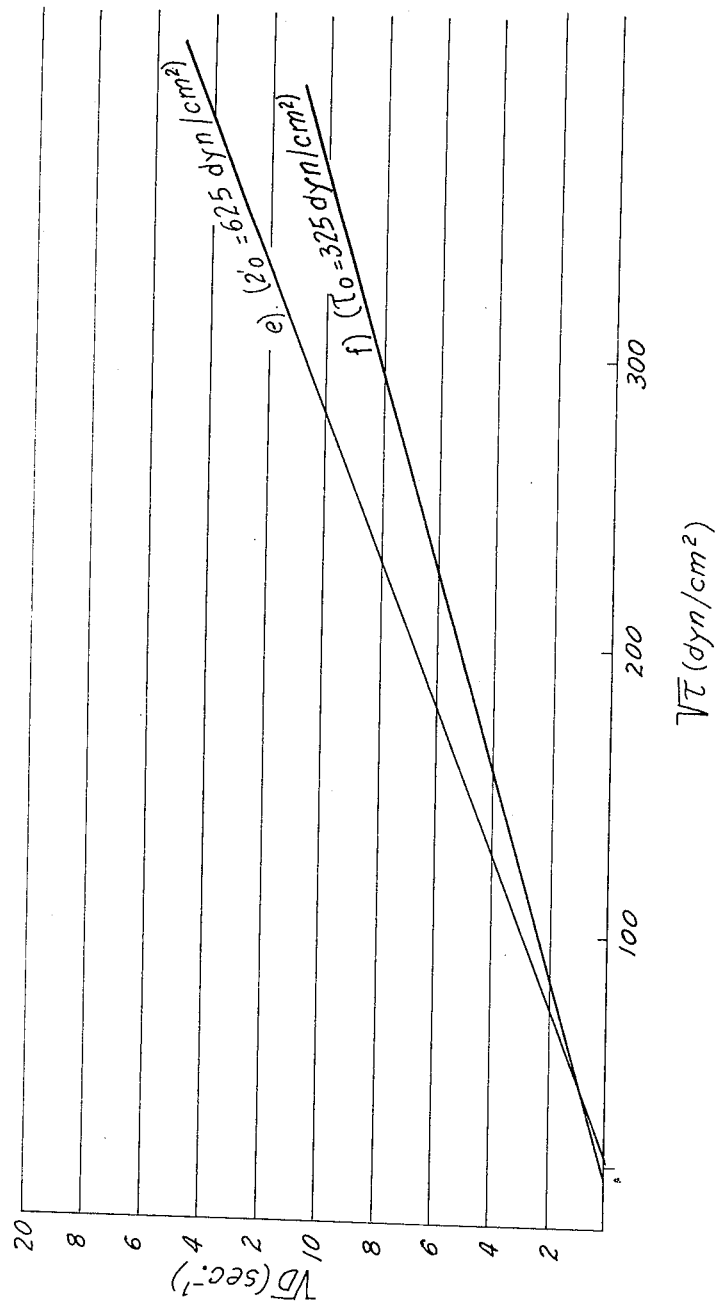
FIG. 4 shows flow curves of printing inks containing the three-component pigment compositions (including silicon dioxide) of the invention which have been pre-wetted with castor oil in comparison with printing inks containing pigment compositions that have only been wetted with mineral oil.

As FIG. 4 shows, the flow limit is substantially lower in a printing ink made with a pigment that has been wetted with castor oil and this in spite of the increase of the viscosity. This confirms the better dispersibility and wetting action of the pigment in case of castor oil.

EXAMPLE 5

This example concerns the effects of the addition of an $SiO_2/Al_2O_3$ co-coagulate to a carbon black pigment composition containing a liquid wetting agent in regard to color depth and color brightness of printing inks.

The carbon black pigment employed was a product made by the German so-called gas-carbon black process and sold under the trademark "Printex U" by the Degussa Corporation of Germany. This product has the following specifications:

| | |
|---|---|
| Median particle diameter (A.): | 230 |
| Specific surface (BET): | 110 m²/g |
| specific surface (determined electro-optically): th | 116 m²/g |
| oil requirements: | 385 |
| color depth (nigrometer index): | 85 |
| volatile components: | 5 % |
| pH-value | 5 |

The wetting agent for this pigment was a mineral oil with a high content of aromatics such as sold under the trademark "Ingralen 450" by the Fuchs Corporation of Germany.

The $SiO_2/Al_2O_3$ co-coagulate was the product sold under the trade name "COK 84" by the Degussa Corporation of Germany. This product had the following specifications:

| | |
|---|---|
| specific surface (BET) | ca. 150 m²/g |
| median particle diameter | 20–60 nm |
| index of refraction | 1.45 |
| structure | X-ray amorphous |
| $SiO_2$-content | 84% ±2% |
| $Al_2O_3$-content | 16% ±2% |

The following table shows a comparison of the different pigments:

TABLE E

| Pigment composition | g | h |
|---|---|---|
| Carbon black ("Printex U") | 90 | 90 |
| Mineral oil ("Ingalen 450") | 10 | 10 |
| $SiO_2/Al_2O_3$ co-coagulate ("COK 84") | — | 1 |

Each of the pigment compositions was made by mixing of the components and subsequent grinding for 4 hours in a ball mill which was a 1-liter ball mill and held 100 g of contents.

The color intensity and brightness values of the compositions were determined by tracing the remission curves of the white added test composition as follows: varnish : pigment : $TiO_2$ = 100 g : 1 g : 30 g. The curves were traced in a spectrum range from 400 to 700 nm by means of a spectrophotometer (Bausch & Lomb product).

The following table shows the standard color values X, Y, and Z and the standard color value components $x$ and $y$. The values were determined for the white added compositions of the pigments following the rules in DIN 5033.

TABLE F

| Pigment Composition | g | h |
|---|---|---|
| Standard color value X | 13.48 | 13.35 |
| Standard color value Y | 13.77 | 13.70 |
| Standard color value Z | 16.01 | 15.89 |
| Sum of X + Y + Z | 43.26 | 42.94 |
| Component $x$ of standard value | 0.312 | 0.311 |
| Component $y$ of standard value | 0.318 | 0.319 |

Figure 5:
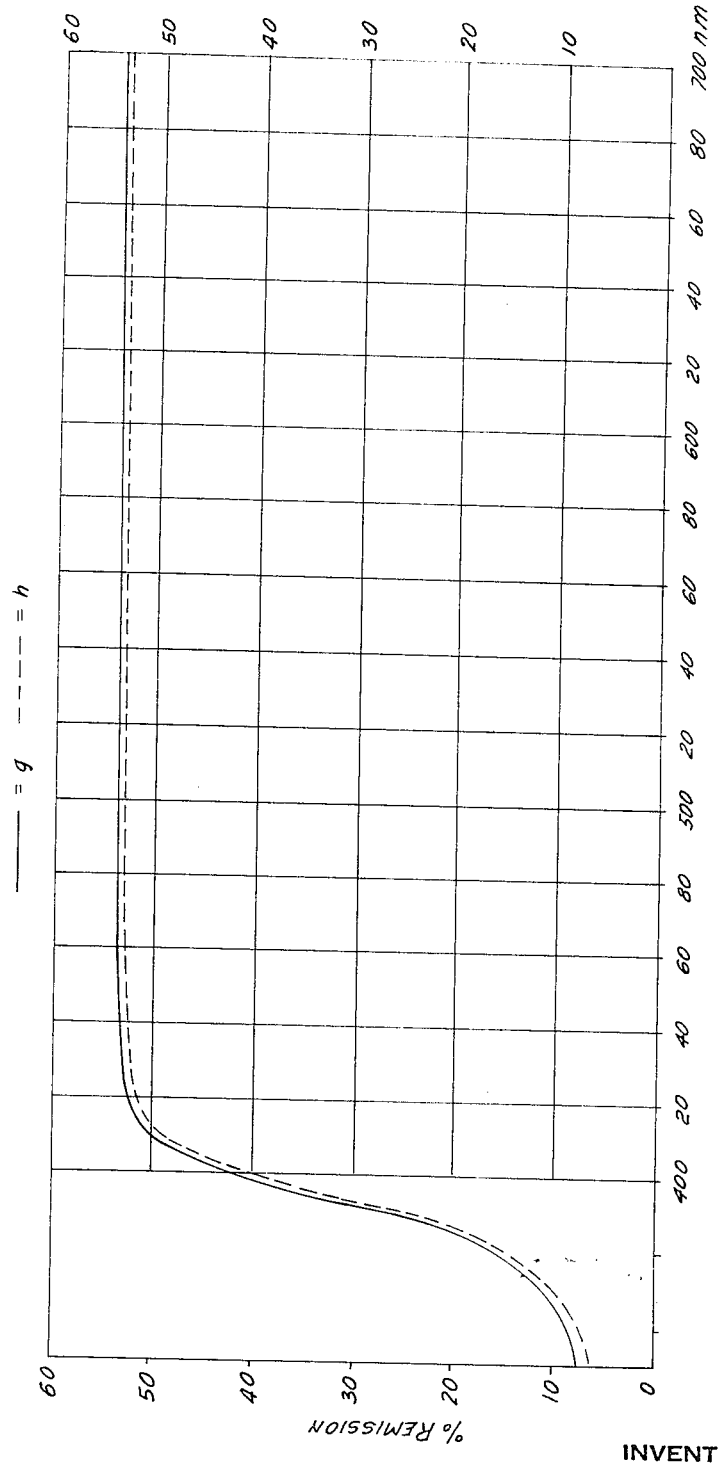
FIG. 5 shows remission curves of white additions of the $SiO_2/Al_2O_3$ co-coagulate containing three-component pigment compositions of the invention, as compared to compositions made without a co-coagulate.

As apparent from the remission curves in FIG. 5, a substantial increase of color depth and brightness results from the use of the three-component pigments of the invention.

There were then further made printing inks with the above-identified pigment compositions g and h, and the degree of gloss of these inks was determined by means of the Lange glossmeter at an angle of 45°:

TABLE G

| Pigment Composition | Degree of Gloss (%) |
|---|---|
| g | 35.5 |
| h | 59.1 |

As appears, the increase of the gloss in case of the three-component pigment composition was quite substantial.

Figure 6:
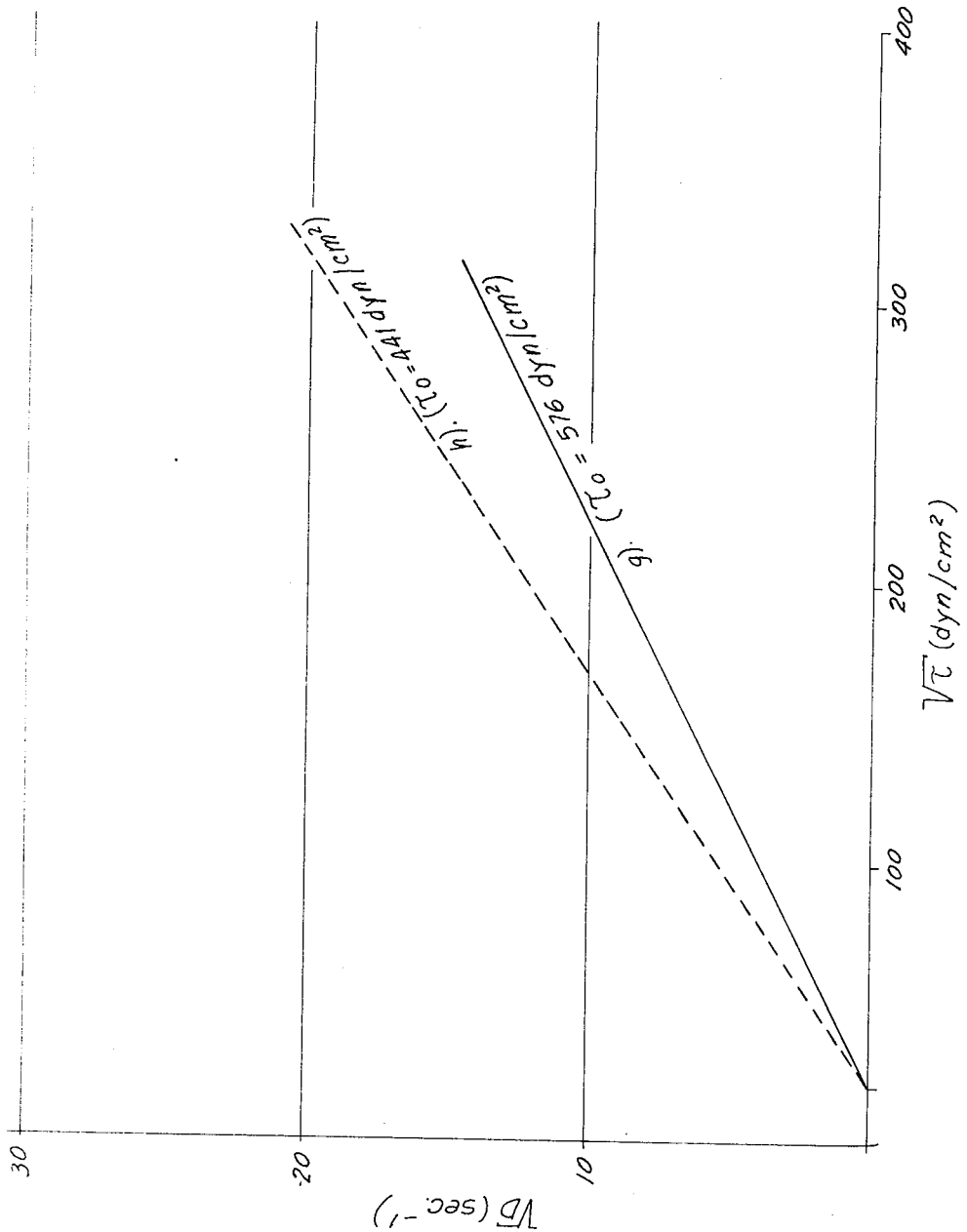
FIG. 6 shows flow curves of printing inks including a three-component pigment composition containing $SiO_2/Al_2O_3$ co-coagulate, in comparison to printing inks made without such co-coagulate.

The flow limits of the printing inks were likewise determined. As FIG. 6 shows, these flow limits were substantially lowered when using the pigments of the invention.

In addition a substantial increase of the color density is indicated by the densitometer values of full surfaces of book prints. The following measurements were obtained:

TABLE H

| Pigment Composition | Densitometer Value |
|---|---|
| g | 2.27 |
| h | 2.35 |

There were furthermore measured the brightness-related values—y—in 1 : 30 white additions by means of a JEL apparatus for various rotations:

TABLE I

| Rotations | 20 | 50 | 100 | 200 |
|---|---|---|---|---|
| Y for g | 18.6 | 17 | 17 | 16.4 |
| Y for h | 18.6 | 17.9 | 16.2 | 15.6 |

The anti-agglomeration and grinding-aid effects of the co-coagulate are quite clear in the case of pigment composition h.

EXAMPLE 6

For use in coloring plastic compositions the carbon black above-mentioned ("Printex G") was wetted with 9 percent "Ingralen 450" and 1 percent "COK 84" all of which products have been identified before. Upon dispersion on a three-roller apparatus, the following degrees of fineness of a PVC paste could be ascertained:

TABLE K

| | Grinding run | | |
|---|---|---|---|
| | 1 | 2 | 3 |
| "Printex G", ply | 35–40 | 30 | 30 mg |
| "Printex G", wetted | 30 | 25 | 20 |

Composition of the paste:

70—PVC ("Vestolit E 7001")
30—Di-octylphthalate
0.5—stabilizer (Advance 5216")
1—"Printex G" or pigment composition.

As appears, a better distribution and absence of streaks or pigment agglomerations exists, as compared with the non-wetted carbon black, when foils are pressed from these pastes using the pre-wetted "Printex G." By means of the densitometer, the following color density values could be determined for these foils:

normal "Printex G" 1.50-60
pre-wetted "Printex G" 1.80-90

We claim:

1. A pulverulent pigment composition for subsequent incorporation in printing inks, lacquer paints, surface coating paints and coloring compositions for elastomers and plastics, said composition comprising an organic, inorganic or carbon black pigment, a liquid having pigment wetting properties and an agent for preventing agglomeration and for controlling the wetting of said pigment consisting of at least one pyrogenically produced and coagulated $SiO_2$ or cocoagulate thereof with $Al_2O_3$, the said liquid having pigment wetting properties being present in an amount of between 3 and 30 weight per cent and said oxide being present in an amount of between 1 and 5 weight percent referred to the total weight of the pigment composition.

2. The pigment composition of claim 1 wherein said liquid having pigment wetting properties is an oil plasticizer or resin solution.

3. The pigment composition of claim 1 wherein said agent for preventing agglomeration consists of a single type of oxide.

4. The pigment composition of claim 1 wherein said agent for preventing agglomeration consists of mixed oxide or an oxide mixture.

5. The pigment composition of claim 1 wherein said agent for preventing agglomeration includes silicon dioxide.

6. The pigment composition of claim 1 wherein said agent for preventing agglomeration includes a coagulate of silicon dioxide and aluminum oxide.

7. The pigment composition of claim 1 wherein said liquid having pigment wetting properties is castor oil.

8. The pigment composition of claim 1 wherein said pigment is Milori blue, said liquid having pigment wetting properties is castor oil and is present in an amount of 3–15 weight per cent and said agent for preventing agglomeration is silicon dioxide and has the following properties:

| | |
|---|---|
| specific surface (BET) | 50–400 m²/g. |
| structure | x-ray amorphous |
| index of refraction | 1.45 |
| particle diameter | 8–20 nm. |

9. The pigment composition according to claim 1 wherein said pigment is Milori blue, said liquid having pigment wetting properties is castor oil and is present in an amount of 3–15 weight percent and said agent for preventing agglomeration is a co-coagulate of silicon dioxide and aluminum oxide and has the following properties:

| | |
|---|---|
| specific surface (BET) | ca.150 m²/g. |
| structure | x-ray amorphous |
| index of refraction | 1.45 |
| particle diameter | 20–60 nm. |

* * * * *